Patented Aug. 5, 1930

1,771,985

UNITED STATES PATENT OFFICE

WILLIAM S. CALCOTT, OF PENNS GROVE, NEW JERSEY, AND HERBERT W. WALKER, OF WILMINGTON, DELAWARE, ASSIGNORS TO E. I. DU PONT DE NEMOURS & COMPANY, OF WILMINGTON, DELAWARE, A CORPORATION OF DELAWARE

NONCORROSIVE ALCOHOLIC SOLUTION

No Drawing.   Application filed October 5, 1928. Serial No. 310,672.

This invention relates to aqueous alcoholic solutions which are substantially inert with respect to iron. More particularly, it pertains to the use of aldehyde-amine condensation products as a class of compounds which act as inhibitors for iron corrosion by aqueous solutions of mono- and polyhydric alcohols.

As is well known, water solutions of these alcohols attack metallic iron in the form of free metal, steel and cast iron, very rapidly under ordinary conditions and considerable corrosion, as indicated by spots of rust, iron oxide deposits and sediment, takes place.

We have found that if a small quantity of an aldehyde-amine condensation product be dissolved in a monohydric alcohol such as ethyl alcohol or in a polyhydric alcohol such as glycerine or ethylene glycol and the alcohol then diluted to any desired concentration with water there results a mixture which does not corrode iron to the extent that it is rusted in an alcohol solution of the same concentration not so treated. A distinct protective action on iron is observed in alcohol solutions treated with these aldehyde-amine condensation products after heating several days at 85–90° C. The aldehyde-amine condensation products which thus decrease very appreciably the rate of corrosion of iron in mono- and polyhydric alcohol solutions are those formed by condensing aldehydes with ammonia or aliphatic or aromatic primary, secondary or substituted amines.

For example, if the butylaldehyde-aniline condensation product, molar ratio of 2:1, be dissolved in ethyl alcohol, glycerine, or ethylene glycol to the extent of 0.1% of the final solution and water added to the alcohol to make a 40% ethyl alcohol, glycerine or glycol solution, there results a mixture which is less corrosive to iron than an untreated alcohol solution. The above molar ratio is given only as an example and it is not our intention to be limited thereto as it may be varied within desirable limits.

The particular substances employed in the above example, which is presented only by way of illustration may, of course, be substituted by other compounds of similar constitution. Thus, for the butylaldehyde we may substitue formaldehyde, acetaldehyde, benzaldehyde, furfuraldehyde, aldol, etc., and in place of aniline, mono- or diethyl aniline, o-toluidine, p-toluidine, a- or b-naphthylamine, benzidine, n-butylamine, n-dibutylamine, ethanol amines, etc. may be used.

Moreover, products containing carbon disulfide in combination with the aldehyde-amine combination may likewise be advantageously employed.

The protective action of the described aldehyde-amine combinations is retained in hot alcoholic solutions as well as those kept at room temperature with the result that these compounds may be advantageously employed for reduction of corrosion in automobile radiators by mono- and polyhydric alcohol anti-freeze mixtures as well as in iron storage tanks, drums or cans.

The inhibitors may be employed either singly or in combination or may be employed together with other agents in preparing noncorrosive alcoholic solutions. They may also be employed to inhibit corrosion by a mixture of alcohols.

As many different combinations of the general type herein disclosed may be employed and are within the scope of the invention, it is not our intention to be limited except as indicated by the appended claims.

We claim:

1. The process of inhibiting the corrosion of an oxidizable metal upon contact with an aqueous alcoholic solution which comprises contacting said solution with the oxidizable metal in the presence of an aldehyde-amine condensation product.

2. The process of inhibiting the corrosion of iron upon contact with an aqueous alcoholic solution which comprises contacting said solution with the iron in the presence of a product resulting from the condensation of an aldehyde with an amine.

3. The process of inhibiting the corrosion of iron upon contact with an aqueous alcoholic solution which comprises contacting said solution with the iron in the presence of a product resulting from the condensation of an aldehyde with an amine of the group consisting of aniline, mono-ethyl-aniline, diethyl aniline, o-toluidine, p-toluidine, a naphthylamine, b-naphthylamine, benzidine, n-butylamine, n-dibutylamine and the ethanol amines.

4. The process of inhibiting the corrosion of iron upon contact with an aqueous alcoholic solution which comprises contacting said solution with the iron in the presence of a product resulting from the condensation of an aldehyde of the group consisting of butylaldehyde, formaldehyde, acetaldehyde, benzaldehyde, furfuraldehyde and aldol with an amine.

5. The process of inhibiting the corrosion of iron upon contact with an aqueous alcoholic solution which comprises contacting said solution with the iron in the presence of a product resulting from the condensation of an aldehyde of the group consisting of butylaldehyde, formaldehyde, acetaldehyde, benzaldehyde, furfuraldehyde and aldol with an amine of the group consisting of aniline, mono-ethyl-aniline, diethyl aniline, o-toluidine, p-toluidine, a-naphthylamine, b-naphthylamine, benzidine, n-butylamine, n-dibutylamine and the ethanol amines.

6. The process of inhibiting the corrosion of iron upon contact with an aqueous alcoholic solution which comprises contacting said solution with the iron in the presence of butylaldehyde-aniline.

7. The process of inhibiting the corrosion of iron upon contact with an aqueous alcoholic solution which comprises contacting said solution with the iron in the presence of an aldehyde-amine carbon disulfide condensation product.

8. A mixture substantially non-corrosive toward iron and comprising an aqueous solution of an alcohol and an aldehyde-amine.

9. A mixture substantially non-corrosive toward iron and comprising an aqueous solution of an alcohol and a product resulting from the condensation of an aldehyde of the group consisting of butylaldehyde, formaldehyde, acetaldehyde, benzaldehyde, furfuraldehyde and aldol with an amine of the group consisting of aniline, mono-ethyl-aniline, diethyl aniline, o-toluidine, p-toluidine, a-naphthylamine, b-naphthylamine, benzidine, n-butylamine, n-dibutylamine and the ethanol amines.

10. A mixture substantially non-corrosive toward iron and comprising an aqueous solution of an alcohol and the product resulting from the condensation of 2 moles of an aliphatic aldehyde with 1 mole of a primary amine.

11. A mixture substantially non-corrosive toward iron and comprising an aqueous solution of an alcohol and the product resulting from the condensation of an aliphatic aldehyde with a primary aromatic amine.

12. A mixture substantially non-corrosive toward iron and comprising an aqueous solution of an alcohol and the product resulting from the condensation of 2 moles of butylaldehyde with 1 mole of aniline.

In testimony whereof we affix our signatures.

WILLIAM S. CALCOTT.
HERBERT W. WALKER.